(12) United States Patent
Park et al.

(10) Patent No.: US 10,532,668 B2
(45) Date of Patent: Jan. 14, 2020

(54) STRIKER MOUNTING STRUCTURE OF REAR SEAT BACK FOR VEHICLE

(71) Applicants: HYUNDAI MOTOR COMPANY, Seoul (KR); KIA MOTORS CORPORATION, Seoul (KR)

(72) Inventors: Hyung Gyu Park, Anyang-si (KR); Jung Woo Hur, Seoul (KR); Vamshi Krishna Janagam, Telangana (IN); Aseesh Chintala, Telangana (IN)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 151 days.

(21) Appl. No.: 15/822,671

(22) Filed: Nov. 27, 2017

(65) Prior Publication Data
US 2019/0031048 A1    Jan. 31, 2019

(30) Foreign Application Priority Data

Jul. 27, 2017    (KR) .......................... 10-2017-0095253

(51) Int. Cl.
*B60N 2/005*    (2006.01)
*B60N 2/28*    (2006.01)

(52) U.S. Cl.
CPC ............... *B60N 2/005* (2013.01); *B60N 2/28* (2013.01)

(58) Field of Classification Search
CPC .............................. B60N 2/366; B60N 2/2245
See application file for complete search history.

(56) References Cited

U.S. PATENT DOCUMENTS

| | | | | |
|---|---|---|---|---|
| 5,713,634 A * | 2/1998 | Koike | .................... | B60N 2/643 297/378.13 |
| 6,257,632 B1 * | 7/2001 | Jung | .................... | E05B 85/045 292/341.15 |
| 7,909,372 B2 * | 3/2011 | Yamada | ................. | B60N 2/366 292/340 |
| 2008/0007093 A1 * | 1/2008 | Andou | .................... | B62D 25/04 296/193.08 |

FOREIGN PATENT DOCUMENTS

JP    2004268806 A   *  9/2004  ............. B62D 25/08
KR    10-2017-0036550 A    4/2017

* cited by examiner

*Primary Examiner* — Sarah B McPartlin
(74) *Attorney, Agent, or Firm* — Morgan, Lewis & Bockius LLP

(57) ABSTRACT

A striker mounting structure of a rear seat back for a vehicle is disclosed, which comprises a mounting bracket with assemble hole; a striker fixedly coupled to the mounting bracket inserted into the assemble hole, and detachably coupled to a seat back of a rear seat; and a seat belt retractor mounting portion at which a seat belt retractor is mounted, and coupled to the mounting bracket, so that it is possible to reduce weight and cost.

13 Claims, 6 Drawing Sheets

STRIKER MOUNTING STRUCTURE OF REAR SEAT BACK FOR VEHICLE

CROSS-REFERENCE TO RELATED APPLICATION

This application claims priority to and the benefit of Korean Patent Application No. 10-2017-0095253 filed in the Korean Intellectual Property Office on Jul. 27, 2017, the entire contents of which are incorporated herein by reference.

BACKGROUND

(a) Technical Field

The present disclosure relates to a striker mounting structure of a rear seat back for a vehicle. More particularly, the present disclosure relates to a striker mounting structure of a rear seat back for a vehicle in which a wire rod type striker is joined to a mounting bracket mounted on a vehicle body.

(b) Description of the Related Art

Generally, a seat back frame of a rear seat back for a vehicle can be removably fixed to a striker assembly mounted on a vehicle body on the side thereof.

The striker assembly is a structure for fixing the rear seat back to the vehicle body. The striker assembly includes a mounting bracket fixed to the vehicle body by bolts or welding, and a wire rod type striker joined to the mounting bracket.

The conventional striker has been fixed in such a way that the ends of the two portions forming the linking ring of the striker are welded to either the upper surface or side wall of the mounting bracket.

In other words, the rear seat back was connected to the striker's linking ring in a ring connection manner, and a pair of rod portions integrally extending from the linking ring is welded to the upper or side wall surfaces of the mounting bracket.

However, in the conventional art, when the striker rod was welded to the upper surface of the mounting bracket, the strength of the striker is increased, but the welding seat of the rod to the upper surface of the mounting bracket occupies a lot of seating surface, thereby disadvantaging the package layout.

In this case, since the welding surface of the upper surface of the mounting bracket is secured in order to weld the rod of the striker to the upper surface of the mounting bracket, so that the width of the entire mounting bracket is inevitably large, which reduces the capacity of the vehicle luggage room and increases the cost and weight.

On the other hand, in the conventional art, when the rod of the striker is welded to the side wall of the mounting bracket, the rigidity of the striker may be deteriorated while it is advantage to secure the luggage room capacity and the package layout.

On the other hand, if the vehicle uses both liquefied petroleum gas (LPG) fuel as well as gasoline fuel, an integrated fuel inlet has been used for injecting gasoline fuel and LPG fuel simultaneously. In this case, the mounting bracket cannot be used because the LPG fuel injection hose for injecting LPG fuel passes through the mounting bracket mounting area due to layout.

In order to address this layout problem, hinge bolting type striker instead of welding type striker has been applied, but it is disadvantageous in terms of cost and weight.

The above information disclosed in this Background section is only for enhancement of understanding of the background of the disclosure and therefore it may contain information that does not form the prior art that is already known to a person of ordinary skill in the art.

SUMMARY

The subject matter of the present disclosure has been made in an effort to provide a striker mounting structure of a rear seat back for a vehicle capable of reducing weight and cost by mounting a striker to a vehicle body using a seat belt retractor mounting bracket.

A striker mounting structure of a rear seat back for a vehicle according to an embodiment of the present disclosure may include a mounting bracket with assemble hole; a striker fixedly coupled to the mounting bracket inserted into the assemble hole, and detachably coupled to a seat back of a rear seat; and a seat belt retractor mounting portion at which a seat belt retractor is mounted, and coupled to the mounting bracket.

An extension portion may be formed at one side of the mounting bracket so that the seat belt retractor mounting portion is formed on the extension portion.

The seat belt retractor mounting portion may include a nut bonded to the mounting bracket.

At least one foam portion may be formed on the mounting bracket.

The striker may include a U-shaped latch portion inserted through the assemble holes; and two leg portions extending from both ends of the latch portion and joined to the mounting bracket.

Burring may be applied to the edge of the assemble hole.

A reinforcing bracket is bonded to a part of the latch portion at one side of the striker and one side surface of the mounting bracket.

The reinforcing bracket may include two semicircular receiving grooves in which the latch portion is received.

At least one bead may be formed on the reinforcing bracket.

The mounting bracket may be bonded to a quarter inner panel.

A striker penetration hole, a LPG fuel hose penetration hole, a gasoline fuel pipe penetration holes may be formed in the quarter inner panel, respectively.

The mounting bracket may include a flange bonded to the wheel house.

A flange may be formed at a rear door striker mounting bracket for mounting a rear door striker to which a rear door is hanged and fixed to a vehicle body, and the flange may be bonded to the mounting bracket.

A quarter outer panel may be bonded to the quarter inner panel and a portion of the quarter outer panel may be overlapped with and bonded to the mounting bracket.

In accordance with a striker mounting structure of a rear seat back according to an embodiment of the present disclosure, a conventional seat belt retractor mounting bracket can be used to mount the striker on the vehicle body to reduce weight and cost.

In addition, by directly welding the striker to the quarter inner panel, the weight can be reduced by reducing the length of the striker.

Furthermore, it is possible to improve the seat and seat anchorage rigidity by applying an overlap welding structure and it is not necessary to use a separate mounting bracket, so that when the rear shock absorber is mounted on the vehicle body, interference with the mounting bracket does not occur, and mounting workability can be improved.

BRIEF DESCRIPTION OF THE DRAWINGS

These drawings are for reference purposes only and are not to be construed as limiting the technical idea of the present disclosure to the accompanying drawings.

DETAILED DESCRIPTION OF THE EMBODIMENTS

Figure 1:
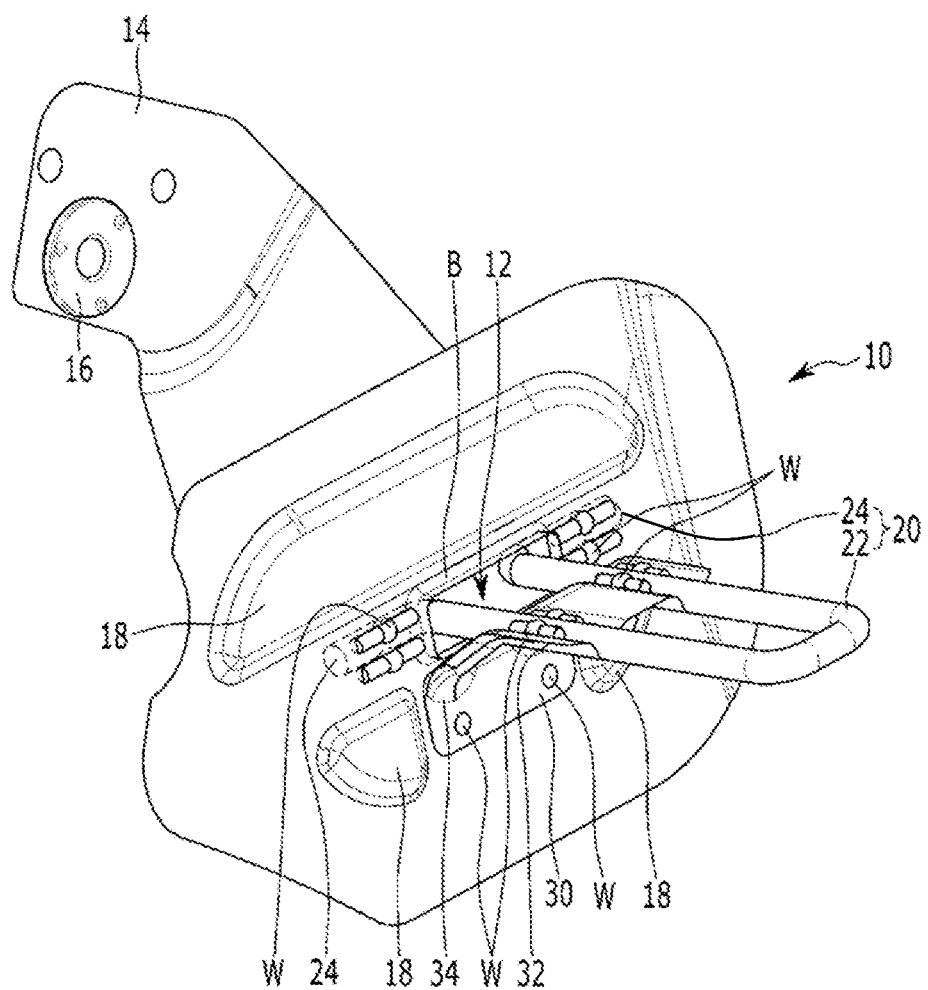
FIG. 1 is a perspective view showing a striker mounting structure of a rear seat back for a vehicle according to an embodiment of the present disclosure.

Hereinafter, embodiments of the present disclosure will be described in detail with reference to the accompanying drawings so that those skilled in the art can easily carry out the present disclosure. As those skilled in the art would realize, the described embodiments may be modified in various different ways, all without departing from the spirit or scope of the present disclosure.

The drawings and descriptions are to be regarded as illustrative in nature and not restrictive. Like reference numerals designate like elements throughout specification.

Since the size and thickness of each configuration shown in the drawing are arbitrarily shown for convenience of explanation, the present disclosure is not necessarily limited to the one shown in the drawing, but the thickness may be enlarged, where necessary, to clearly represent the various portions and regions.

In the following detailed description, the names of the components are distinguished by first, second, and so on to distinguish the components from each other by the same relationship, and the following description is not limited to the order.

It is to be understood that throughout the specification, unless otherwise indicated, all such modifications as may be made will be apparent to one of ordinary skill in the art without departing from the scope of the present disclosure.

Figure 2:
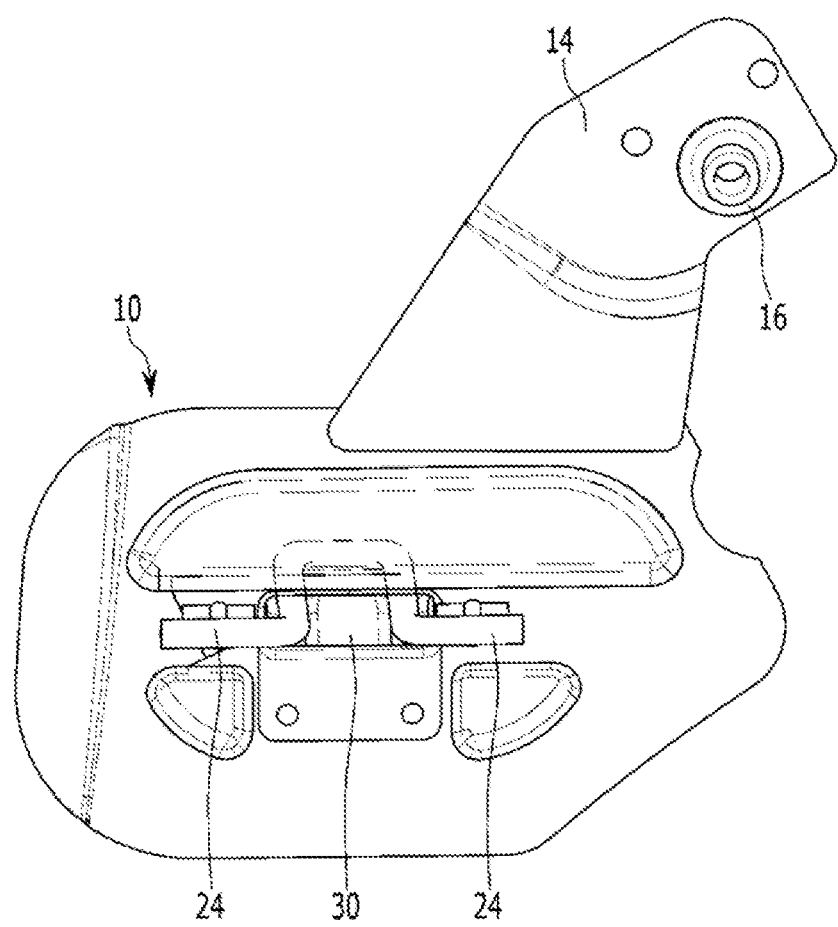
FIG. 2 is a rear perspective view of the striker mounting structure of the rear seat back for the vehicle according to an embodiment of the present disclosure.

Referring to FIG. 1 and FIG. 2, a striker mounting structure 100 of a rear seat back for a vehicle according to an embodiment of the present disclosure may be applied to a hatchback type passenger vehicle that secures a seat back of a rear seat to a vehicle body.

For example, a striker mounting structure of a rear seat back for a vehicle may be applied to secure a rear seat back of a small vehicle with a relatively insufficient capacity of the trunk room to the vehicle body.

The striker mounting structure 100 of the rear seat back for the vehicle may be installed on the inner side of a wheel house or a rear pillar of the vehicle body to detachably fix the rear seat back to the vehicle body via a catcher, and may include a mounting bracket 10, a striker 20 and a reinforcing bracket 30.

The mounting bracket 10 may be formed in a generally planar shape.

In the mounting bracket 10, a substantially rectangular shaped assemble hole 12 may be formed and the striker 20 may be inserted and assembled through the assemble hole 12.

An arm type extension portion 14 may be integrally formed on one side of the mounting bracket 10, and a nut 16 may be welded to the extension portion 14 as a mounting portion for mounting a seat belt retractor.

Since the conventional seat belt retractor and the striker 20 for fixing the rear seat back may be mounted simultaneously by using only one mounting bracket 10, the number of parts and weight and cost may be reduced.

The mounting bracket 10 may be formed with at least one foam portion 18 protruding in an upward direction to increase its structural rigidity.

The at least one foam part 18 may be formed at the periphery of the region where rigidity may be deteriorated due to the formation of the assemble hole 12, that is, at the periphery of the assemble hole 12.

The at least one foam part 18 may be formed of a triangular shape, a square shape, or another shape.

The striker 20 may be a wire rod type and may include a generally "U" shaped latch portion 22 and two legs 24 extending from both ends of the latch portion 20.

The latch portion 22 is inserted through the assemble hole 12 and the two leg portions 24 may be welded W to the backside of the mounting bracket 10, respectively.

A burring B may be formed at the surrounding edge of the assemble hole 12 to ensure rigidity.

The two leg portions 24 of the striker 20 may be welded to the mounting bracket 10 while the latch portion 22 protrudes through the assemble hole 12. The reinforcing bracket 30 may be applied to increase the mounting stiffness of the striker 20.

The reinforcing bracket 30 may be bonded to a part of the latch portion 22 and one side of the mounting bracket 10 at one side of the striker 20 to securely support the striker 20 to the mounting bracket 10

One side of the reinforcing bracket 30 may be attached to one side of the latch portion 22 with welding W, and the other side may be attached to one side of the mounting bracket 10 with welding W.

The reinforcing bracket 30 may include two semicircular receiving grooves 32 in which the latch portion 22 is received.

The reinforcing bracket 30 may be formed with at least one bead 34 to increase its structural stiffness.

In an embodiment of the present disclosure, only one reinforcing bracket 30 is shown, but two reinforcing brackets 30 may be used to support the striker 20 in the middle.

According to the order of assembling procedure of a striker mounting structure of a rear seat back for a vehicle according to an embodiment of the present disclosure, firstly, the two leg portion 24 of the striker 20 is $CO_2$-welded to the backside of the mounting bracket 10, the reinforcing bracket 30 is spot welded to the mounting bracket 10, and then the striker 20 is welded to the reinforcing bracket 30.

This order of assembly is only one example.

Figure 3:
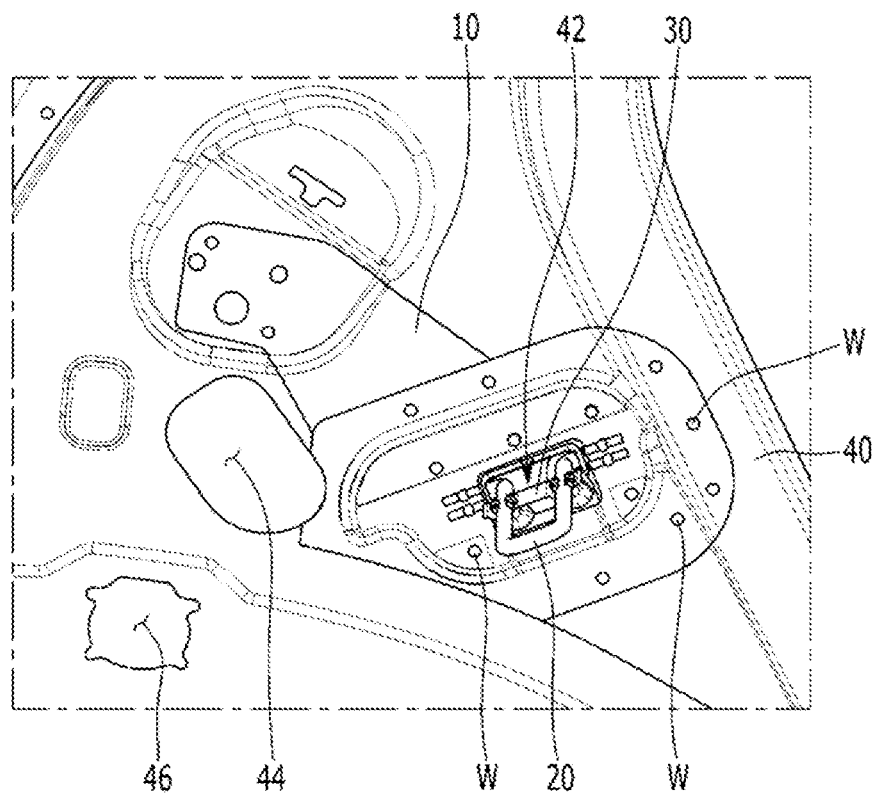
FIG. 3 is a perspective view of the striker mounting structure of the rear seat back for the vehicle joined to a quarter inner panel according to an embodiment of the present disclosure.

Referring to FIG. 3, the striker 20 may joined to the mounting bracket 10, and the striker 20 may reinforced with the reinforcing bracket 30, the mounting bracket 10 may be welded to the quarter inner panel 40 at multiple portions.

The quarter inner panel 40 may be formed with a striker penetration hole 42, an LPG fuel hose penetration hole 44, and a gasoline fuel pipe penetration hole 46, respectively.

Figure 4:
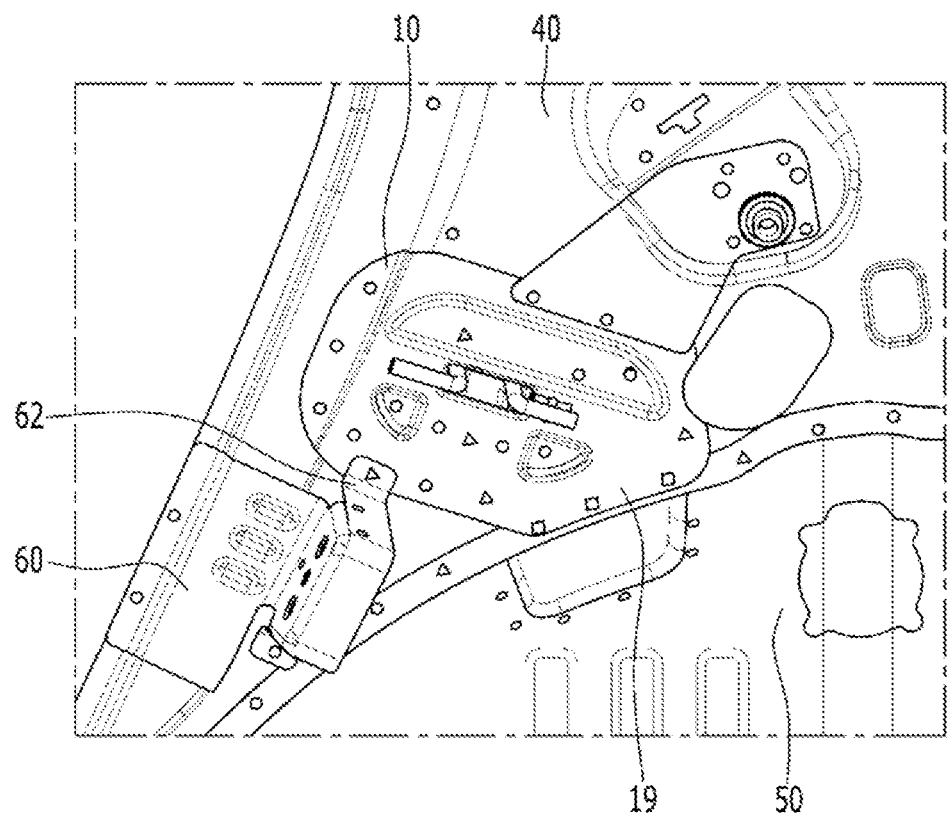
FIG. 4 is a perspective view of the striker mounting structure of the rear seat back for the vehicle joined to a quarter inner panel according to an embodiment of the present disclosure.

Referring to FIG. 4, the mounting bracket 10 may be bonded to the wheel house 50 by forming flange 19 on one side to increase its mounting rigidity.

Further, the mounting stiffness of the rear door striker mounting bracket 60 may be increased by forming a flange 62 on one side of a rear door striker mounting bracket 60 for mounting a rear door striker, and bonding to the striker mounting bracket 10.

Figure 5:
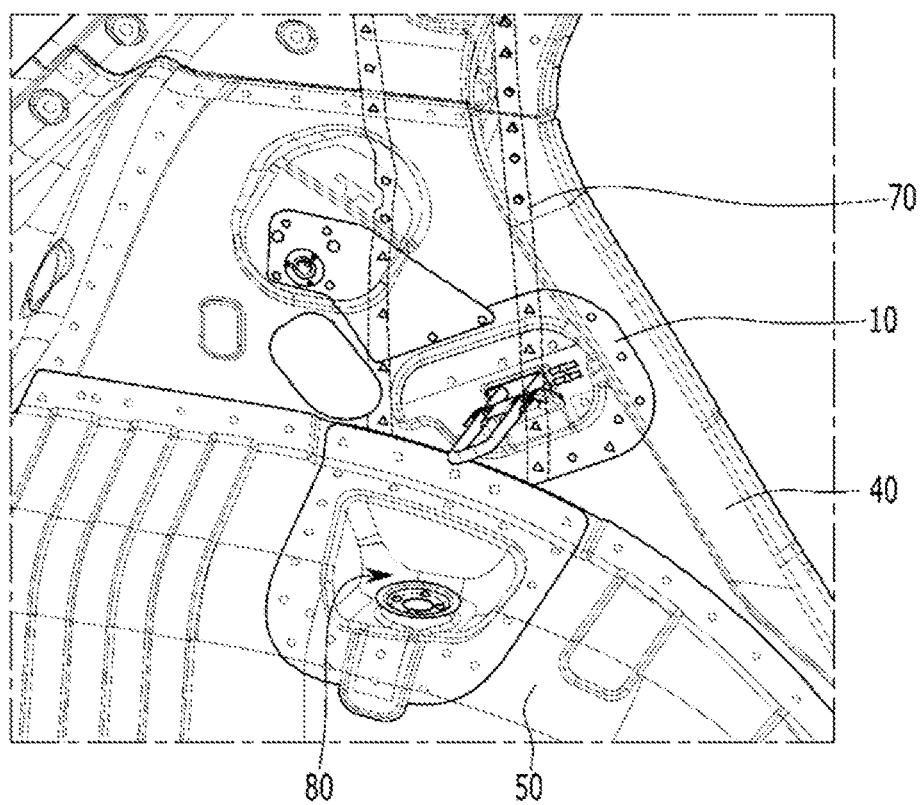
FIG. 5 is a perspective view where the striker mounting structure of the rear seat back for the vehicle according to an embodiment of the present disclosure is bonded to a quarter inner panel and a quarter outer panel is bonded the quarter inner panel.
Figure 6:
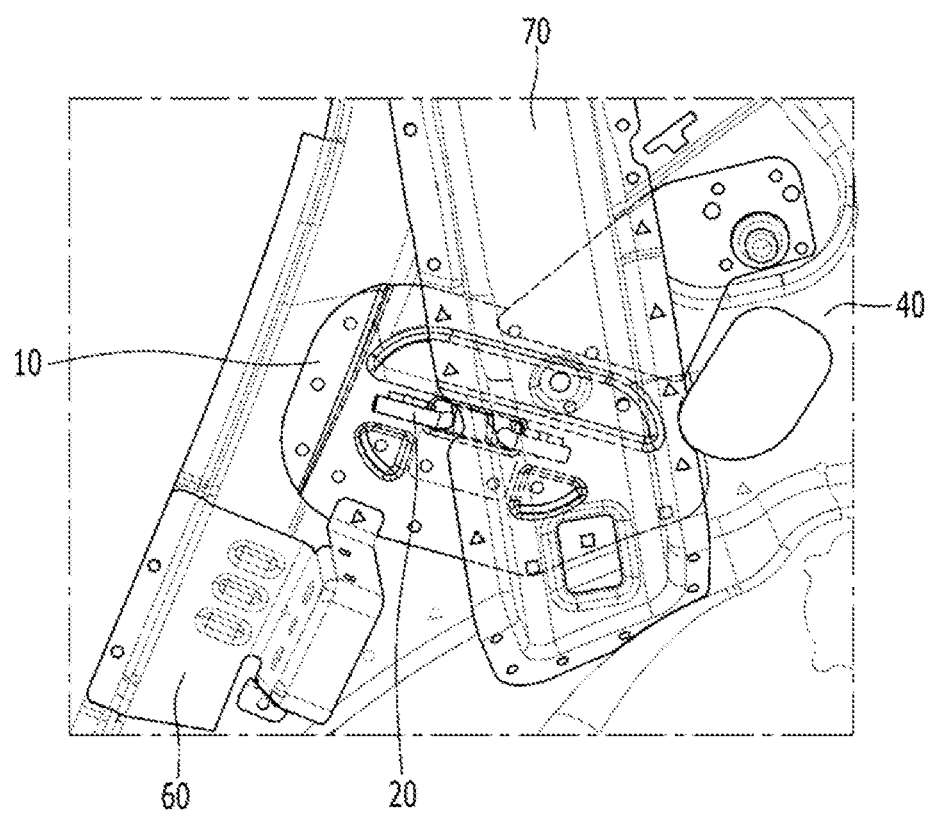
FIG. 6 is a perspective view in the other direction of FIG. 5.

Referring to FIG. 5 and FIG. 6, the quarter outer panel 70 may be bonded to the quarter inner panel 40 to increase the rigidity of the quarter panel. In this regard, when a part of the outer quarter panel 70 is overlapped with the mounting bracket 10 and welded together, the mounting rigidity of the mounting bracket 10 may be further increased. Even when the rear shock absorber mounts on the rear shock absorber mounting portion 80, the space between the striker 20 and the rear shock absorber mounting portion 80 is sufficient, so that workability in installing the rear shock absorber may be improved.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A striker mounting structure of a rear seat back for a vehicle, comprising:
   a mounting bracket with assemble hole;
   a striker fixedly coupled to the mounting bracket inserted into the assemble hole, and detachably coupled to a seat back of a rear seat; and
   a seat belt retractor mounted on a seat belt retractor mounting portion coupled to the mounting bracket,
   wherein at least one foam portion is formed on the mounting bracket.

2. The striker mounting structure of claim 1, wherein an extension portion on which the seat belt retractor mounting portion is formed, is formed at one side of the mounting bracket.

3. The striker mounting structure of claim 2, wherein the seat belt retractor mounting portion comprises a nut bonded to the mounting bracket.

4. The striker mounting structure of claim 1, wherein the striker comprises:
   a U-shaped latch portion inserted through the assemble hole; and
   two leg portions extending from both ends of the latch portion and joined to the mounting bracket.

5. The striker mounting structure of claim 4, wherein a reinforcing bracket is bonded to a part of the latch portion at one side of the striker and one side surface of the mounting bracket.

6. The striker mounting structure of claim 5, wherein the reinforcing bracket comprises two semicircular receiving grooves in which the latch portion is received.

7. The striker mounting structure of claim 5, wherein at least one bead is formed on the reinforcing bracket.

8. The striker mounting structure of claim 1, wherein burring is applied to an edge of the assemble hole.

9. The striker mounting structure of claim 1, wherein the mounting bracket is bonded to a quarter inner panel.

10. The striker mounting structure of claim 9, wherein a striker penetration hole, a liquefied petroleum gas (LPG) fuel hose penetration hole, and a gasoline fuel pipe penetration hole are formed in the quarter inner panel.

11. The striker mounting structure of claim 9, wherein a quarter outer panel is bonded to the quarter inner panel and a portion of the quarter outer panel is overlapped with and bonded to the mounting bracket.

12. The striker mounting structure of claim 1, wherein the mounting bracket comprises a flange bonded to a wheel house.

13. The striker mounting structure of claim 1, wherein a flange is formed at a rear door striker mounting bracket for mounting a rear door striker to which a rear door is hanged and fixed to a vehicle body, and the flange is bonded to the mounting bracket.

* * * * *